United States Patent [19]
Peter

[11] Patent Number: 5,459,627
[45] Date of Patent: Oct. 17, 1995

[54] DISK DRIVE HAVING AN O-RING DISK CLAMP

[75] Inventor: Gary M. Peter, Boise, Id.

[73] Assignee: Hewlett-Packard Company, Palo Alto, Calif.

[21] Appl. No.: 153,253

[22] Filed: Nov. 16, 1993

[51] Int. Cl.$^6$ .......................... G11B 17/08; G11B 17/02; H02K 7/14
[52] U.S. Cl. .................................. 360/98.08; 360/99.12; 310/67 R
[58] Field of Search ............................ 360/98.01, 98.07, 360/98.08, 99.04, 99.05, 99.08, 99.12; 310/67 R

[56] References Cited

U.S. PATENT DOCUMENTS

| | | | |
|---|---|---|---|
| 3,587,074 | 6/1971 | Angle et al. | 360/99.08 |
| 4,337,491 | 6/1982 | Hasler et al. | 360/97.02 |
| 4,870,703 | 9/1989 | Augeri et al. | 360/98.07 |
| 4,945,432 | 7/1990 | Matsudaira et al. | 360/98.02 |
| 4,968,910 | 11/1990 | Meier et al. | 310/42 |
| 5,031,062 | 7/1991 | Wood | 360/98.08 |
| 5,059,844 | 10/1991 | Anstine | 310/90 |
| 5,101,306 | 3/1992 | Johnson | 360/98.08 |
| 5,243,481 | 9/1993 | Dunckley et al. | 360/98.08 |
| 5,249,090 | 9/1993 | Fehse | 360/98.08 |
| 5,267,106 | 11/1993 | Brue et al. | 360/98.08 |
| 5,317,225 | 5/1994 | Miyaji et al. | 360/98.08 |
| 5,367,418 | 11/1994 | Chessman et al. | 360/99.12 |

Primary Examiner—A. J. Heinz
Assistant Examiner—Jefferson Evans
Attorney, Agent, or Firm—E. F. Oberheim

[57] ABSTRACT

In an elastic coaxial coupler, a cylindrical body of a first member is fitted through an opening in a second member seating said second member upon a flange on the first member. A circumferential groove in the cylindrical body has a conical groove surface confronting a surface of the second member adjacent the opening in the second member. An O-ring in tension around the cylindrical body at the circumferential groove, is drawn into the circumferential groove by the radial force component of the O-ring tension force and is compressed between the conical groove surface and the surface of the second member adjacent the opening in the second member, to securely frictionally engage the second member to the flange of the first member. In an application of this elastic coaxial coupler to a hard disk drive, the first member is the hub of a disk assembly and the second member is the hard disk. In a different application of this elastic coaxial coupler to a hard disk drive, the first member is the rotor of the disk motor and the second member is the hard disk hub.

6 Claims, 2 Drawing Sheets

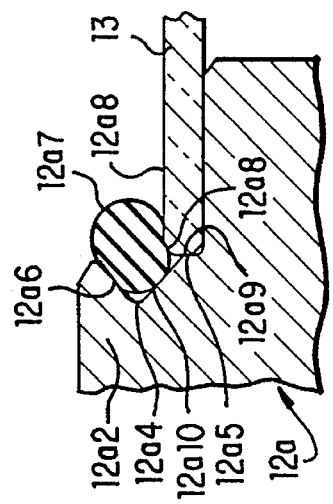
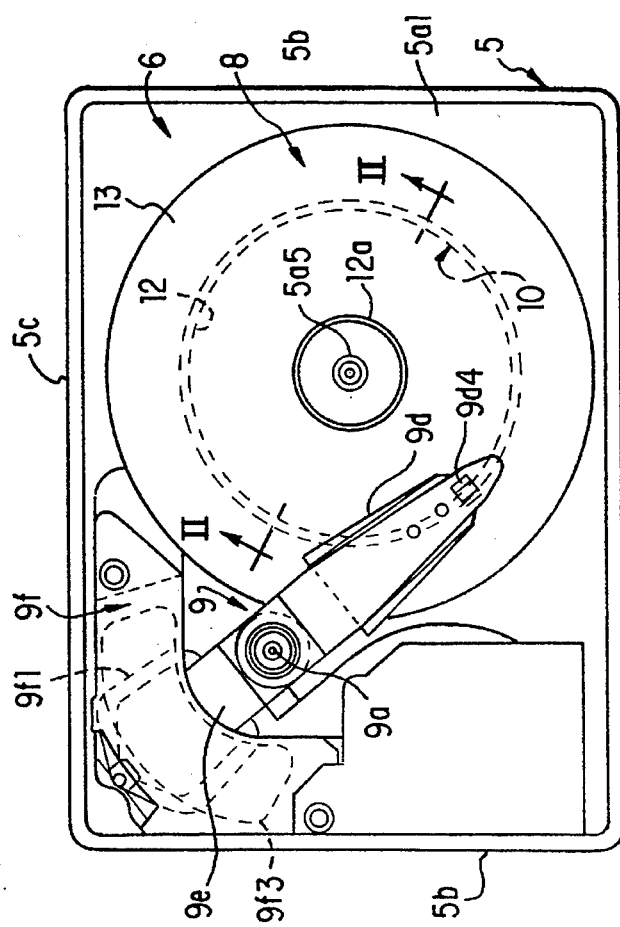

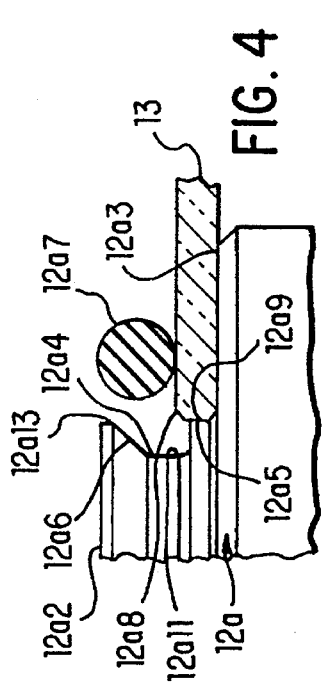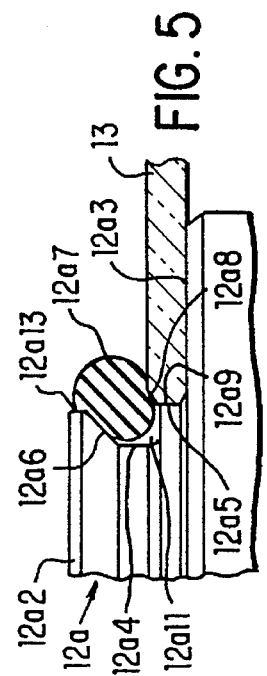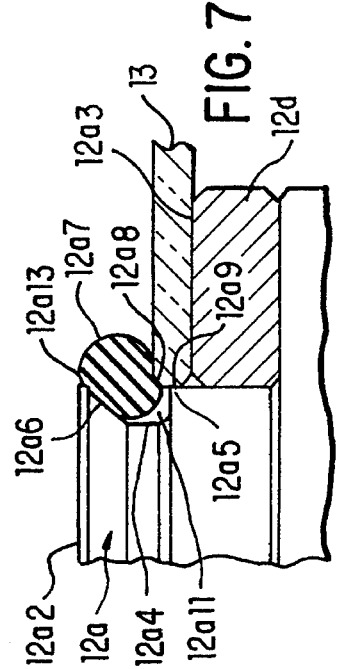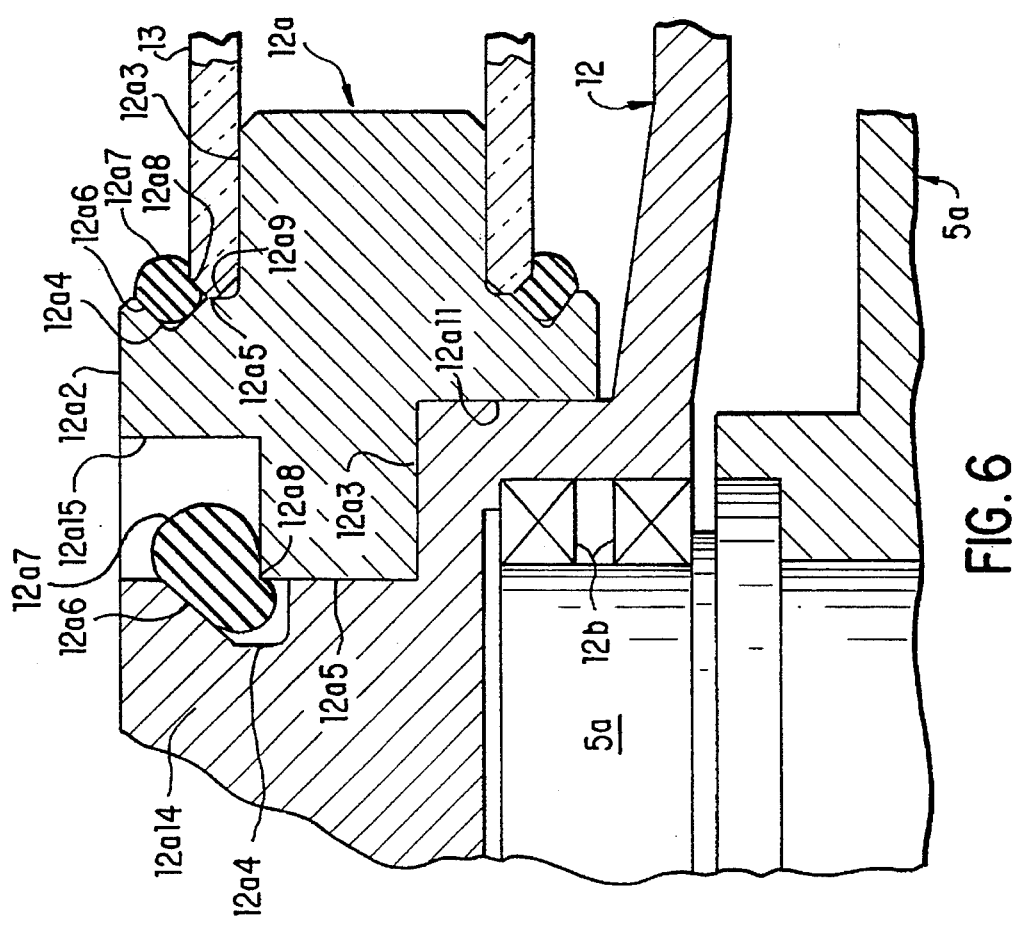

DISK DRIVE HAVING AN O-RING DISK CLAMP

TECHNICAL FIELD

This invention relates generally to coaxial couplers having particular utility in disk drives. The invention concept is disclosed in its application in coaxially coupled disk assemblies for hard disk drives.

BACKGROUND OF THE INVENTION

Hard disk assemblies for disk drives usually involve some form of clamping member to secure one or more disks to a hub, which in some instances may be part of a rotor of a motor or in other instances may be a disk hub adapted for attachment directly to a motor rotor or shaft.

The U.S. patents to Matsudaira et al U.S. Pat. Nos. 4,945,432, and Wood et al 5,031,062 are examples of disk attachments to a hub in which a plurality of disks are stacked and spaced on a cylindrical spindle hub which is part of the motor rotor. The disks are secured in compression between a bottom flange on the cylindrical spindle hub and a clamp at the top of the cylindrical spindle hub.

Examples of disk hub attachments to a motor shaft are found in the U.S. patent to Hasler et al U.S. Pat. Nos. 4,337,491, and to Angle et al 3,587,074.

The patent to Matsudaira et al, teaching the fabrication of a disk assembly employing a plurality of ceramic or glass disks, rather than metal disks, is concerned with the problem of compressional compliance in the disk stack between the lower flange on the cylindrical hub on which the disks are assembled and the top clamp. To this end, Matsudaira et al incorporates soft annular spacers between the individual disks and the metal spacer rings. The soft annular spacers include adhesives, O-rings and washers between the metal spacer rings and the disks in the stack.

The patentees Wood et al discuss the problems associated with disk stack fabrication in smaller form factor disk drives, mentioning particularly a 2.5 form factor. While structuring a disk stack in a manner somewhat similar to that of Matsudaira et al on a cylindrical spindle hub, between a bottom flange on that cylindrical spindle hub and a top clamp on that spindle hub, Wood et al addresses the problem of warping of the disk whenever clamping pressure is applied and employs a flowable material of some sort, including adhesives to fill in valleys in the surfaces on which the individual disks will seat. In this respect, Wood et al on their spacer ring 48, apply flowable material to both sides. When clamping pressure is applied to the disk stack assembled on the cylindrical spindle hub, the flowable material, filling in the valleys or depressions in those parts of the spindle hub and the spacer ring and the clamp engaging the disks, is described as minimizing disk warpage or ripple.

Older technology in hard disk assembly fabrication is represented in the patents to Angle et al and Hasler et al. The technology of Angle et al, dating back to the mid to late 1960s, describes the assembly of a single hard disk to a hub which is to be attached to the end of a motor shaft. The hub is provided with a flange against which the hard disk is seated. A wedge in the form of a split ring engages the opposite surface of the disk at the hub and fits into a circumferential V-shaped slot in the hub, in which position the hard wedge secures the disk against axial movement.

The patent to Hasler et al being, directed primarily to a description of a motor in connection with brushless DC fabrication of that motor, devotes little attention to the fabrication of a disk assembly, but provides within the cover of the disk drive assembly a pair of coaxially disposed axially spaced disks clamped in a hub which is adjustably and removably secured to the end of the motor shaft.

Structures such as these have limitations in their application to the smaller form factor disk drives, referring particularly to those scaled below the 2.5 form factor, referenced by the patentees Wood et al. There are limits, for example, to which the scale down of parts may be taken in fabricating the small form factor disk drives. Thus, structural simplification in disk assembly designs in small form factors is indicated.

An example of such simplification is found in a currently available 1.3 form factor disk drive in which adhesive bonding of one or more disks to a disk hub constitutes the sole means of attachment of the disks to the hub. This represents a very desirable solution to the fabrication of small form factor disk assemblies. It brings with it, however, in fabrication, the need for extreme care in the application of an adhesive to parts to be joined together to avoid drive contamination and, additionally, in the selection of an adhesive as the bonding agent, in which, ideally, there is rapid curing and zero out gassing in the long term.

The search for improvement and simplification in the design of fabrication of small form factor disk assemblies continues.

SUMMARY OF THE INVENTION

Improvement in hard disk assemblies as to their design and fabrication is achieved, according to this invention, in the provision of a coaxial coupling structure and technique in which a hard disk structure is secured to a disk hub solely by an elastic ring, such as an O-ring. The coaxial coupling technique is applicable whether the disk hub is an integral part of a motor rotor or a separate disk hub adapted for attachment to a motor rotor. The disk hub in either case may mount one or more disks. The disk hub is preferably cylindrical in configuration and is provided with at least one annular axial surface such as a circumferential flange. The hard disk is provided with a central circular opening which is a slip fit over the cylindrical section or body of the disk hub. This concentrically indexes the disk with the disk hub in a position with the disk seated upon the flange. A circumferential groove in the cylindrical body of the disk hub has a lower circumferential edge which is just above the axial surface on the flange on which the hard disk is seated and which is below the upper surface of the hard disk. The circumferential groove has an upper conical groove surface above the disk which slopes downwardly an inwardly of the cylindrical body. The elastic coaxial coupler comprises an elastic member, such as an O-ring, of lesser planform diameter than the diameter of the cylindrical body of the disk hub. The O-ring has a cross-sectional dimension while in tension greater than the dimension between the upper conical groove surface of the circumferential groove and the upper circular edge of the circular opening in the hard disk. The radial force component of the tension force in the O-ring draws the O-ring into the circumferential groove, compressing the O-ring between the upper conical groove surface of the circumferential groove and the upper circular edge of the circular opening in the center of the hard disk. By this expedient, the hard disk is frictionally secured to the disk hub by static friction between the hard disk face seated upon the annular axial surface of the flange, by static friction between the hard disk and the O-ring and the O-ring to the upper conical groove surface of the circumferential groove in the cylindrical body of the disk hub.

In those applications where the disk hub is separate from the motor rotor and requires attachment thereto, a cylindrical body portion of the motor rotor receives the disk hub. The coaxial coupling concept is applicable here by employing and O-ring in a circumferential groove in the cylindrical rotor body to join the separate disk hub to the motor rotor.

The coupling technique of this invention is most advantageously practiced where the motor rotor rotates on a fixed shaft or spindle. Here the rotor functioning as the disk hub rotates relative to the fixed shaft or spindle making the use of a single coaxial screw between the rotor and the spindle in disk clamping structures impossible.

In the small form factor disk drives, the disks are quite thin and, whether the disk is of a material such as metal, ceramic or glass, care must be exercised in finishing the axial surface of the flange to achieve a degree of flatness within acceptable tolerances of ripple, or other disk surface departures from flatness, for the purpose of avoiding modulation of the transducer signal in different circumferential positions on the disk and, in the extreme, to avoid transducer crashes on the disk.

The elimination of adhesives in joining the hard disk to the disk hub eliminates problems of contamination and the possibility of long term outgassing, both of which are detrimental to disk drive function. Additionally, the use of the O-ring for attaching the hard disk to the disk drive hub, significantly simplifies fabrication of the disk assembly, shortens the time for assembly, does not increase the parts count and allows rework.

In the event that surface finishing of the axial surface of the flange upon which the hard disk is seated may not be accomplished within acceptable tolerances, a lapped ring, separate from the disk, having an outer diameter corresponding approximately to that of the outer diameter of the flange of the disk hub and having an inner diameter corresponding to the circular opening in the disk, may be adhesively joined to the hard disk about the central opening by adhesive bonding to form a hard disk structure in which the central opening is defined by the inner diameter of the lapped ring and the central opening in the hard disk. This hard disk structure may be disposed upon the flange with the lapped ring at the upper surface of the disk or with the lapped ring in a position against the annular axial surface of the flange.

BRIEF DESCRIPTION OF THE DRAWINGS

The invention will be better understood by reference to the following specification when considered in conjunction with the accompanying drawings, in which:

FIG. 1 is a plan view of a hard disk drive having a hard disk assembly embodying the principals of this invention.

FIG. 2 is a sectional view of the hard disk assembly of the hard disk drive, taken in the section plane 11–11 of FIG. 1.

FIG. 3 is an enlarged cross sectional view of the disk assembly of FIG. 2 detailing one embodiment of this invention.

FIG. 4 is an enlarged cross sectional view of a variation of the disk assembly of FIGS. 2 and 3 embodying the best mode for practicing this invention, showing the disk assembly partially assembled.

FIG. 5 shows the disk assembly of FIG. 4 in assembled condition.

FIG. 6 is an enlarged sectional view of a further variation of the disk assembly of FIGS. 2 and 3, and FIG. 7 is a fragmentary sectional view of a variation of the disk assembly of FIG. 5.

BEST MODE FOR PRACTICING THE INVENTION

FIGS. 1–3 provide plan and sectional views of an application of the coaxial coupler in a hard disk drive. These figures, while depicting the structure of a small form factor (1.3 form factor), hard disk drive, useful in a PCMCIA memory cassette, should not be construed as limiting this invention in its application to a disk drive or to any particular size of disk drive. Typically these figures are drawn to an enlarged scale, FIG. 2 being an enlargement of FIG. 1, and FIG. 3 being a further enlargement of a fragmentary portion of FIG. 2, to permit the illustration of essential detail.

In FIGS. 1 and 2, a mainframe or base structure 5 of metal, such as aluminum, which is the backbone, i.e., the primary structural member of the disk drive structure, is preferably a single piece of milled or cast metal which is precision machined, having a base plate 5a with integral end walls 5b and side walls 5c.

Since the electrical function of this disk drive is not necessary to an understanding of this invention, the printed circuit assembly for the disk drive is not shown.

A cover 5e is secured, as by adhesive bonding, to the upper edges of the end walls 5b and the side walls 5c of the base structure or mainframe 5, to seal and further stiffen the assembly.

The hard disk drive 6 comprises a hard disk assembly 8 and a rotary actuator assembly 9. The rotary actuator assembly 9 is journaled on a spindle 9a and comprises two arm structures 9d, one above and one below the hard disk assembly 8. Each arm structure mounts a transducer, such as a magnetic head 9d4, at its distal end in a position confronting a surface of the disk. Only the upper arm structure 9d is seen in the drawings, appearing only in FIG. 1. An actuator motor arm 9e mounts a coil 9f1 of an axial gap actuator motor 9f. The electromagnetic field of the coil 9f1 links the magnetic field of a permanent magnet structure 9f3 mounted to the base structure 5. As is known, the coil is reversibly energized to move the rotary actuator bidirectionally about the spindle 9a. The hard disk assembly 8, which is one example of the subject of this invention is described herebelow.

The hard disk assembly 8, comprises a disk hub 12a having a cylindrical section or body 12a2 and an annular axial surface 12a3. These are part of an umbrella-shaped, disk motor rotor 12 of a radial gap disk motor 10. A hard disk structure 13 is secured to the annular axial surface 12a3 of the disk motor rotor 12. In first and second embodiments of this invention, seen in FIGS. 1–3, and FIGS. 4, 5, respectively, the hard disk structure 13, is a single disk which is seated directly upon the axial surface 12a3. In a third embodiment of this invention, seen in FIG. 6, the hard disk structure comprises a pair of disks. In a fourth embodiment of this invention, seen in FIG. 7, the hard disk structure comprises a hard disk having a lapped, centrally positioned, reinforcing ring adhesively bonded thereto.

In FIGS. 1 and 2, the disk motor 10 comprises a salient pole stator 11 which is mounted directly to the base structure 5 within the umbrella-shaped motor rotor 12. The outer ends of the salient poles of the stator define a radial gap with a permanent magnet ring 12f disposed within the umbrella-shaped rotor, the permanent magnet ring 12f being radially spot magnetized in alternating polarity in equally spaced circumferential positions thereabout, defining a number of permanent magnet poles greater (or less) in number than the number of salient poles. The disk motor rotor 12 is of a magnetic flux conducting material such as steel and forms the flux return path for the radially disposed permanent magnet poles.

High data volume demands in the smallest possible mechanical packaging, regardless of the form factor size, results in limited space within the disk drive housing for various mechanical structures. Thus, any simplification of the mechanical design which eliminates parts or which simplifies fabrication becomes a requirement for fabrication of the drive. In a structure of the type of FIG. 2, for example, a simplification which is presently used in the fabrication of the disk drive employs an adhesive bond between the hard disk structure 13 and the axial surface 12a3 of the disk hub. Employing this adhesive bonding as the sole means of attaching the hard disk structure 13 to the disk hub 12a eliminates any need for mechanical devices of the type of Matsudairi et al to clamp the hard disk structure 13 to the axial surface 12a3. Adhesive bonding, however, requires extreme care in fabrication to avoid any possibility of introducing contaminants to the disk drive during and after assembly. It is also irreversible. Rework is not possible. Thus, the pursuit of simplification and improvement in the design and fabrication of the hard disk assembly continues and this invention proposes a unique concept which further simplifies fabrication by eliminating the need for adhesive bonding.

As seen in the cross sectional views of FIGS. 2 and 3, the hard disk structure of the hard disk assembly embodies a single disk. The disk hub 12a is an integral part of the motor rotor 12 and is provided with the annular axial surface 12a3 upon which the disk is seated. A concentric cylindrical body 12a2 of the disk hub 12a projects from this axial surface 12a3. A circumferential groove 12a4 is formed in the cylindrical body 12a2. A lower circumferential edge 12a5, FIG. 3, of the circumferential groove 12a4 is positioned below the upper surface of the hard disk structure 13. The upper conical surface 12a6 of the circumferential groove 12a4 slopes downwardly and inwardly in the cylindrical body 12a2, as best seen in the enlarged cross sectional view of FIG. 3, in a position above the hard disk structure 13. A ring 12a7 of elastic material, for example, an O-ring, is seated in the circumferential groove 12a4. A central circular opening 12a9 in the hard disk structure 13 is a slip fit over the cylindrical body 12a2. The circular elastic ring 12a7 is of lesser planform diameter than the diameter of the cylindrical body 12a2. In stretched condition, seated in the circumferential groove 12a4 the elastic ring 12a7 has a cross sectional dimension greater than the dimension between the upper conical surface 12a6 of the groove 12a4 and the upper edge or chamfered surface 12a8 of the circular opening 12a9 in the hard disk structure 13. Thus, the tension force of the elastic ring 12a7, as best seen in FIG. 3, has a radial force component which draws the elastic ring into the circumferential groove 12a4 where it is compressed between the upper conical surface 12a6 of the circumferential groove 12a4 and the upper edge or rim 12a8 of the circular opening 12a9 in the disk structure 13. In this position, the elastic ring 12a7 is deformed in compression in the groove 12a4 against the edge 12a8 of the disk. Thus, the hard disk structure 13 is pressed against the annular axial surface 12a3 of the disk hub 12a, in secure static frictional engagement therewith. The hard disk 13 is further secured to the cylindrical body 12a2 by the static friction coupling between the hard disk structure 13 and the cylindrical body 12a2, provided by the elastic ring 12a7. As here depicted, the circumferential groove 12a4 is of V-shaped cross section. It will be appreciated, however, that other cross sectional configurations may be employed, the cross section of the circumferential groove 12a4 representing the best mode being seen in FIGS. 4, 5 and 7, hereafter. The penetration of the elastic ring 12a7, into the groove 12a4 for a given elastic ring tension varies with the cross sectional dimension and the elasticity of the ring material.

While the V-shaped groove 12a4 of FIGS. 2 and 3 represents a satisfactory groove configuration, there is a possibility, within dimension tolerances in fabrication, that the installed O-ring 12a7 may contact the lower sloping surface 12a10 of the V-shaped groove 12a4, as seen in FIG. 3. This may be undesirable in that compressional loading of the disk may be reduced. FIGS. 4, 5 and 7, representing the presently known best mode for practicing this invention, depict a circumferential groove 12a4 having a lower portion 12a11 which is clear of the O-ring. This opens up the lower section of the circumferential groove 12a4, displacing the lower groove surfaces 12a11 from the O-ring body which projects into the groove, obviating contact therebetween.

The O-ring has a cross sectional diameter which is greater than the dimension between the conical groove face 12a6 and the edge 12a8 of the central circular opening 12a9 of the disks 13. A typical unstretched diameter is seen in FIG. 4. The cross sectional diameter of the O-ring 12a7 is chosen such that the center of the circular cross section, when the O-ring is stretched, is below the upper circular edge 12a13 of the conical surface 12a6 of the groove. Thus, the radial force component of the O-ring tension, draws the O-ring into the groove 12a, compressing the O-ring between the conical surface 12a6 and the circular edge 12a8 of the disk, without O-ring contact with the other groove surfaces in the groove region 12a11, to secure the disk 13 to the hub 12a. The cross sectional diameter of the O-ring is chosen to achieve optimum O-ring penetration into the groove 12a4 without contacting the groove surfaces in the groove region 12a11. The radial component of O-ring force which seats the O-ring 12a7 in the groove 12a4 is a function of the percentage of stretching of the O-ring. Thus, for a given cross sectional diameter of the O-ring, the planar diameter of the O-ring in relation to the diameter of the groove 12a4 determines the amount of stretching of the O-ring that takes place. This determines the radial component of O-ring force which forces or draws the O-ring in the groove 12a4. Satisfactory performance of the coaxial coupler has been obtained with O-rings in tension force ranges, resulting from stretching of O-rings, in a range between 50–200% of the O-ring unstretched circumferential dimension.

In applications where multiple disks are required, as seen in FIG. 6, the disk hub 12a may be a part which is separate from the disk motor rotor 12 and may be provided with upper and lower axial surfaces 12a3 upon which respective disks 13 may be seated and secured by respective O-rings 12a7 fitted in individual circumferential grooves 12a4. In this application, the separate disk hub 12a is provided with a cylindrical cavity 12a16 in its bottom face which is a slip fit over a cylindrical extension 12a14 of the disk motor rotor 12. This hard disk assembly which is separately fabricated, may be adhesively bonded to this upper cylindrical extension 12a14 of the disk motor rotor 12. Alternatively, the disk hub 12a may be threaded over the cylindrical extension 12a14. It is preferred, however, to employ an O-ring attachment such as that employed to secure the disks 13 to the hub 12a to secure the disk hub to the motor rotor. To this end, again referring to FIG. 6, a circumferential groove 12a2 is formed in the cylindrical body 12a14 of the motor rotor 12 and a cylindrical recess 12a1 5 is formed in the upper face of the hub 12a. An O-ring 12a7 is compressed into the groove 12a4 between the conical surface 12a6 of the circumferential groove 12a4 and the circular edge 12a8 in the central circular opening 12a5 of the hub 12a. This structural arrangement provides precise and secure radial and axial indexing of the hub 12a upon the motor rotor 12.

Hard disk structures of the type illustrated in FIGS. 2–6, involving a hard disk 13 or a disk hub 12a seated upon an annular axial surface 12a3, provide secure support of the hard disk structure 13. In situations where the hard disk structure 13 cannot be seated and secured, due to structural considerations involving both the hard disk and the annular axial surface 12a3, without unacceptable disk ripple or warping, this undesirable situation is easily solved, as seen in FIG. 7, by the addition of a lapped ring 12d which has a nearly perfect axial surface. This lapped ring 12d has a central circular opening of the same diameter as that of the hard disk 13 and, in a separate assembly operation, is adhesively bonded in coaxial alignment with the central opening of the disk, defining with the disk the central opening 12a9 which is a slip fit over the cylindrical extension 12a2 of the disk hub. Disk flatness is guaranteed in this assembly of the hard disk structure 13. As seen in FIG. 7, the hard disk structure may be assembled upon the axial surface 12a3 with the ring 12d seated upon the annular axial surface 12a3. Here again, the tension force of the stretched O-ring 12a7 results in the O-ring compression necessary to secure the hard disk structure 13 to the disk hub 12a. The hard disk structure 13 may be inverted from the position illustrated in FIG. 7, in which case the surface of the disk 13 seats upon the annular axial surface 12a3 and the compressional force of the O-ring 12a7, in the circumferential groove 12a4, is applied against the lapped ring 12d. Two benefits result from the use of the lapped ring 12d. One is the guarantee of flatness in the hard disk structure due to the bonding of the hard disk 13 to the lapped surface of the ring 12d. The second benefit is due to the reinforcement of the inner circular portion of the disk which resists warping in the presence of clamping forces.

What is claimed is:

1. A hard disk assembly, comprising:
   a. A disk hub having an annular axial hub surface and a central cylindrical hub body of lesser diameter than the diameter of said annular axial hub surface, axially projecting from said annular axial hub surface;
   b. a hard disk structure having a central circular opening, said circular opening having an upper circular edge and a lower circular edge, said hard disk structure being seated upon said annular axial hub surface with said circular opening disposed concentrically about said cylindrical hub body;
   c. a circumferential hub groove in said cylindrical hub body, said circumferential hub groove having an upper circumferential hub groove edge, a lower circumferential hub groove edge and an upper conical hub groove surface sloping downwardly and inwardly of said cylindrical hub body from said upper circumferential hub groove edge, said lower circumferential hub groove edge being disposed below said upper circular edge of said circular opening in said hard disk structure, said circumferential hub groove further comprising an annular axial hub groove surface in said cylindrical hub body at said lower circumferential hub groove edge and a cylindrical hub groove surface between said annular axial hub groove surface and said conical hub groove surface, and
   d. a hub elastic ring disposed in tension in said circumferential hub groove in contact with said conical hub groove surface and said upper circular edge of said circular opening in said hard disk structure, said hub elastic ring having a cross sectional dimension which is greater than the perpendicular distance between said conical groove surface of said circumferential hub groove and said upper circular edge of said circular opening of said hard disk structure and being drawn into said circumferential hub groove in compression between said conical hub groove surface and said upper circular edge of said circular opening of said hard disk structure by the radial force component of the tension force of said hub elastic ring without elastic ring contact with either said annular axial hub groove surface or said cylindrical hub groove surface.

2. The hard disk assembly according to claim 1, comprising:
   a. a disk motor rotor having an annular axial rotor surface and a cylindrical rotor body of lesser diameter than the diameter of said annular axial rotor surface, said cylindrical rotor body being concentrically disposed of and axially projecting from said annular axial rotor surface;
   b. said disk hub having opposite hub faces and a central circular opening therethrough between said opposite hub faces, said circular opening of said hub having a circular edge at each face of said opposite hub faces, said cylindrical rotor body projecting through said circular opening in said disk hub, one hub face of said opposite hub faces being seated upon said annular axial rotor surface;
   c. said cylindrical rotor body having a circumferential rotor groove therein having an upper circumferential rotor groove edge, a lower circumferential rotor groove edge and an upper conical rotor groove surface sloping downwardly and inwardly of said cylindrical rotor body from said upper circumferential rotor groove edge, said lower circumferential rotor edge being disposed below said upper circular edge of said circular opening in said hub, said circumferential rotor groove further having an annular axial rotor groove surface in said cylindrical rotor body at said lower circumferential rotor groove edge and a cylindrical rotor groove surface between said annular axial rotor groove surface and said conical rotor groove surface, and
   d. an elastic rotor ring disposed in tension in said circumferential rotor groove in contact with said conical rotor groove surface and said upper circular edge of said circular opening in said hub and being compressed therebetween by being drawn into said circumferential rotor groove by the radial force component of the tension force of said elastic rotor ring without elastic rotor ring contact with said annular axial rotor groove surface or said cylindrical rotor groove surface.

3. The hard disk assembly according to claim 1, in which;
   a. said hard disk structure comprises a hard disk which is of a material which is one of, aluminum, ceramic or glass.

4. The hard disk assembly according to claim 1, in which;
   a. said elastic hub ring is an O-ring.

5. The hard disk assembly according to claim 1, in which;
a. said elastic hub ring is placed in tension by stretching to 50%– 200% of its unstretched circumferential dimension when installed in said circumferential hub groove.

6. A hard disk assembly, comprising:
a. a disk motor rotor having an annular axial rotor surface and a cylindrical rotor body of lesser diameter than the diameter of said annular axial rotor surface, said cylindrical rotor body being concentrically disposed of and axially projecting said annular axial rotor surface;
b. a disk hub having an upper axial face and a lower axial face and a central cylindrical opening therethrough between said upper axial face and said lower axial face, said cylindrical opening of said disk hub having an upper circular edge at said upper axial face and a lower circular edge at said lower axial face, said cylindrical rotor body projecting through said cylindrical opening in said disk hub, said lower axial face of said disk hub being seated upon said annular axial rotor surface;
c. at least one disk concentrically mounted to said disk hub;
d. said cylindrical rotor body having a circumferential rotor groove therein having an upper circumferential rotor groove edge, a lower circumferential rotor groove edge and an upper conical rotor groove surface sloping downwardly and inwardly of said cylindrical rotor body from said upper circumferential rotor groove edge, said lower circumferential rotor groove edge being disposed below said upper circular edge of said opening in said disk hub, and
e. an elastic rotor ring disposed in tension in said circumferential rotor groove in contact with said upper conical rotor groove surface and said upper circular edge of said circular opening in said hub and being compressed therebetween by being drawn into said circumferential rotor groove by the radial force component of the tension force of said elastic rotor ring without contact of said elastic rotor ring with other surfaces of said circumferential rotor groove.

* * * * *